United States Patent [19]

Boiteau

[11] Patent Number: 5,280,687
[45] Date of Patent: Jan. 25, 1994

[54] EXTENDED AWNING FOR SLIDE-OUTS

[75] Inventor: Charles C. Boiteau, Chelmsford, Mass.

[73] Assignee: The Dometic Corporation, Elkhart, Ind.

[21] Appl. No.: 998,441

[22] Filed: Dec. 30, 1992

[51] Int. Cl.$^5$ .......................... E04B 7/16; E04B 1/346; B60R 15/00

[52] U.S. Cl. ........................................... 52/67; 52/73; 160/67; 296/163; 296/171

[58] Field of Search .................. 52/67, 73; 160/66, 67, 160/72; 296/163, 171

[56] References Cited

U.S. PATENT DOCUMENTS

| | | |
|---|---|---|
| 2,853,129 | 9/1958 | Leavitt et al. .................. 160/66 |
| 3,381,421 | 5/1968 | Sicklesteel .................. 52/67 |
| 4,214,621 | 7/1980 | Wessels et al. .................. 160/66 |
| 4,312,159 | 1/1982 | Paul . | 
| 4,500,132 | 2/1985 | Yoder . |
| 4,941,524 | 7/1990 | Greer . |
| 5,171,056 | 12/1992 | Faludy et al. . |

Primary Examiner—Neill R. Wilson
Attorney, Agent, or Firm—Pearne, Gordon, McCoy & Granger

[57] ABSTRACT

A retractable awning for recreational vehicle slide-outs prevents rain, snow and other debris from collecting on the roof of the slide-out. The awning is provided with an inner edge secured to the adjacent wall of the recreational vehicle immediately above the slide-out roof. The opposite edge of the awning is connected to a roller journaled on arms pivotally mounted on the outer face of the slide-out. The arms provide oppositely extending lateral projections so that they can support a roller having a length greater than the spacing between the arms. Since the roller must be wider than the awning, the roller has a length exceeding the width of the slide-out roof, and the awning has a width at least equal to the width of the slide-out roof so that full coverage of the slide-out roof is provided. The roller support arms can be pivoted down to provide a typical awning for a window provided in the slide-out.

4 Claims, 3 Drawing Sheets

EXTENDED AWNING FOR SLIDE-OUTS

BACKGROUND OF THE INVENTION

This invention relates generally to retractable awnings, and more particularly, to a novel and improved retractable awning for use with recreation vehicles having retractable slide-out portions.

PRIOR ART

Typical vehicles which must be transported over the roads, such as travel trailers and motor homes, are restricted in width to about eight feet. Any vehicle having a greater width usually requires a wide load permit. This width limitation severely limits the interior lay-out of the vehicle. Therefore, some recreational vehicles have been provided with tip-out portions that are mounted so that they pivot into the vehicle interior for road travel, and pivot out to an exterior position to provide greater interior width when the vehicle is parked. An example of a recreational vehicle with a tip-out is illustrated in the U.S. Pat. No. 4,312,159.

Such tip-out portions generally have a limited length aligned with the length of the vehicle since they are usually manually moved between the retracted and extended position. Further, typical tip-out portions are formed with a curved roof which engages a seal mounted on the adjacent vehicle side wall.

In order to provide larger extendable sections, a retractable structure generally referred to as a "slide-out" has been provided in many recreational vehicles. Such slide-outs are generally rectangular, and in some instances, extend lengthwise of the vehicle for substantial distance. Further, because of their size, such slide-outs are generally moved between the retracted and extended position by powered actuators. An example of a slide-out is illustrated in the U.S. Pat. No. 4,500,132.

Because slide-outs do not move to the extended position with a pivot-like movement, it is customary to form the roof of the slide-out as a flat surface extending parallel to the roof of the vehicle. Such slide-out roofs, which are flat and extend horizontally, tend to collect leaves, snow, dirt and other debris. Although seals have been provided for slide-outs to resist the movement of such debris into the vehicle interior when the slide-out is retracted, difficulty is often encountered because such debris is carried past the seal and enters the interior of the vehicle when the slide-out is retracted for road travel.

In order to prevent the collection of debris on the roof of a slide-out, a retractable awning system has been provided in which a retractable awning was mounted so as to cover a substantial portion of the roof of the slide-out when the slide-out was extended. The intention of such awning was to cause any rain, snow, leaves or other debris to collect on the surface of the awning, and not on the roof, per se. The awning is structured so that as the slide-out is retracted, the awning rolls up on a roller journaled at the outer surface of the slide-out and drops the debris harmlessly on the ground. Such a retractable awning is illustrated and described in the U.S. Pat. No. 5,171,056. The design illustrated in such patent also provided pivoted support arms for mounting the roller of the awning. The pivoted arms permit the awning to extend downwardly and away from the outer surface of the slide-out to provide a window awning for a window provided in the slide-out.

Additional advantages are provided when a retractable awning extends over the roof of a slide-out. The awning shades the roof against excessive solar heat and reduces the noise of rain which would otherwise beat against the slide-out roof.

Although the awning of the U.S. Pat. No. 5,171,056 provides many advantages, difficulty is encountered in many cases because the roller around which the awning winds during retraction of the awning cannot exceed the length of the slide-out because the pivoted arms which support the roller ends are mounted on the outer surface of the slide-out. Further, the awning inherently must be somewhat shorter than the roller. In many cases in which the slide-out is not provided with an extremely wide trim, the awning is not as wide as the roof, and a portion of the roof along each end thereof is not covered by the awning. Consequently, snow, rain and other debris is not prevented from reaching the roof. Since the roof is substantially horizontal and flat, this allowed water to collect on the surface beneath the awning and often results in water entering the interior of the vehicle when the slide-out is retracted.

SUMMARY OF THE INVENTION

In accordance with the present invention, a novel and improved retractable awning system is provided for slide-outs of the type illustrated in the U.S. Pat. Nos. 4,500,132 and 5,171,056 supra, in which the awning width is at least equal to the width of the roof of the slide-out. This prevents water, snow and debris from collecting on the roof and ensures that such debris is not carried into the vehicle interior when the slide-out is retracted.

In order to accomplish this improved performance, the supports for the awning roller, which are mounted on brackets on the outer side wall of the slide-out, are provided with oppositely extending off-sets. With such off-sets, the supports connect to a roller having a length exceeding the width of the slide-out roof. This permits the roller to be provided with an awning which is at least as wide as the slide-out roof. Therefore, the awning provides complete coverage of the entire slide-out roof.

In accordance with the illustrated embodiment of the present invention, the roller supports are provided with lateral projections supporting an awning roller which is longer than the roof width so that the slide-out roof is fully covered and protected from the collection of water, snow or other debris thereon.

These and other aspects of this invention are illustrated in the accompanying drawings and are more fully described in the following specification.

BRIEF DESCRIPTION OF THE DRAWINGS

In FIG. 5, the awning is illustrated in a plurality of extended positions which may be selected as desired.

DETAILED DESCRIPTION OF THE DRAWINGS

Figure 1:
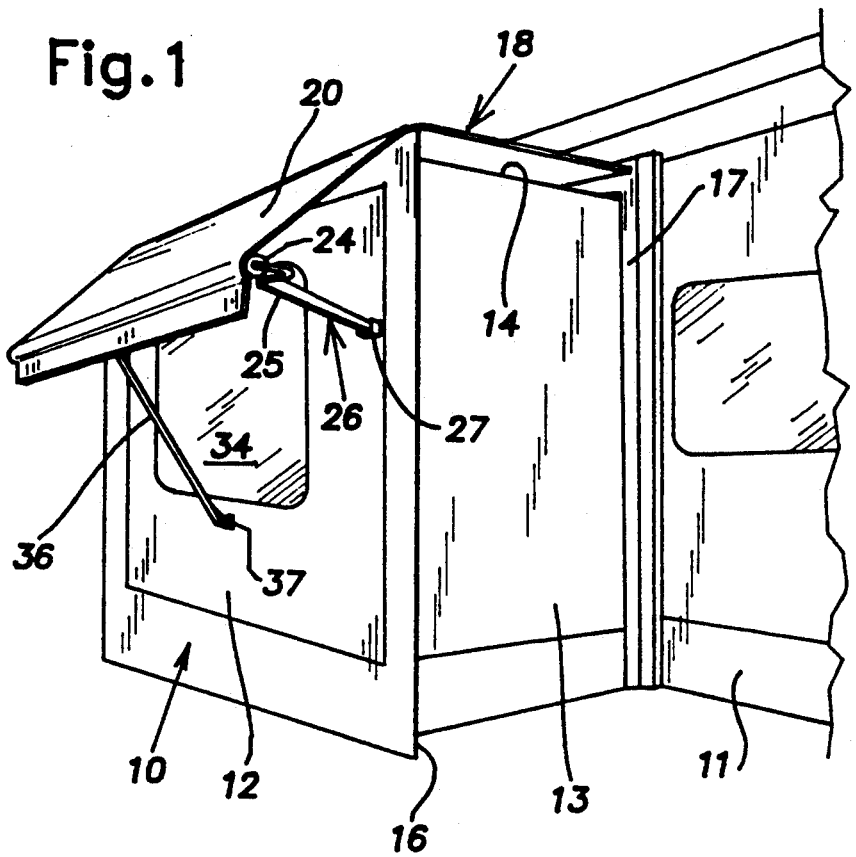
FIG. 1 a fragmentary perspective view illustrating a slide-out with a preferred embodiment of a retractable awning, in accordance with the present invention, mounted thereon.
Figure 2:
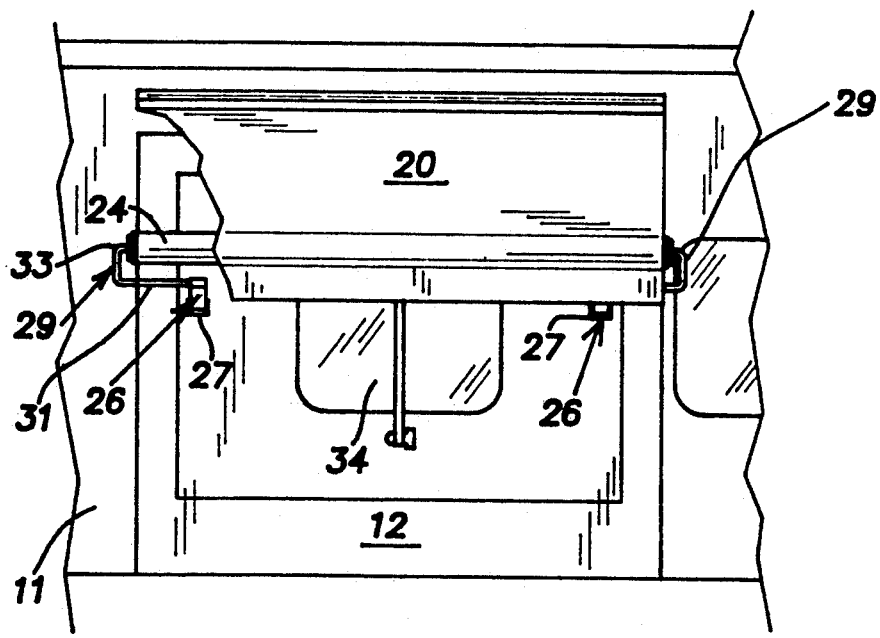
FIG. 2 is a vertical view illustrating the manner in which the supports are structured to support a roller having a length exceeding the spacing between the support brackets.

FIG. 1 illustrates an awning, in accordance with the preferred embodiment of this invention, installed on a slide-out 10 of a recreational vehicle. It should be understood that, as used herein, a recreational vehicle is intended to include substantially any vehicle which has a restricted width because it is transported, at least, on occasion, along roadways. For example, it is intended that the term "recreational vehicle" include mobile homes which are transported along a roadway to a site where they are permanently installed, as well as typical travel trailers of all types, and motor homes of all types.

The illustrated slide-out 10 is generally rectangular in shape and is moveable between an extended position, illustrated in FIG. 1, in which it projects laterally out from one side 11 of a recreational vehicle. The slide-out 10 is moveable between a retracted position, illustrated in FIG. 3, in which the outer side 12 of the slide-out is adjacent to the side wall 11 of the vehicle. In the illustrated embodiment, the outer wall 12 is substantially coplanar with the side of the vehicle 11 in the retracted position. In such position, the remainder of the slide-out 10 extends into the interior of the vehicle. In such retracted position, the total vehicle width is within the limits normally required, which in most recreational vehicles, is about eight feet.

Once the recreational vehicle reaches a location where it is to be used, the slide-out is moved to the extended position to increase the interior space of the vehicle by increasing the width of the interior along at least a portion of the vehicle length. In the extended position, the slide-out provides end walls 13 which extend between the side 11 of the vehicle and the outer wall 12 of the slide-out. In addition, the slide-out provides a generally flat, horizontally extending roof 14 and a floor (not specifically illustrated in the drawings). Typically, furniture is mounted within the slide-out which is carried out beyond the side 11 of the vehicle when the slide-out is extended.

In effect, the slide-out permits the vehicle to be narrowed for road travel and allows the interior space of the vehicle to be increased in width when the vehicle is not traveling. Even relatively small increases in width greatly improve the potential interior furniture arrangements which can be provided.

Typically, the slide-out is provided with a flange-like border 16 which extends along the plane of the outer wall beyond the end walls, roof and floor of the slide-out. This flange 16 not only provides a degree of trim for the slide-out, but also engages a seal 17 built into the vehicle side around the opening through which the slide-out projects. This seal 17 is required to prevent the entry of rain or snow when the vehicle is in the retracted travel condition.

In order to prevent snow, leaves, water or other debris from collecting on the roof 14 of the slide-out when it is in the extended position, the present invention provides an awning system 18 which covers the roof 14. The awning system illustrated includes a flexible awning which may be plastic or fabric 20, and which is provided along one edge with a segmented metal cover portion 21. The metal portion 21 is connected to the side 11 of the vehicle by a mounting rail 23, as disclosed in the U.S. Pat. No. 4,941,524 (assigned to the assignee of the present invention). Such patent is incorporated herein by reference in its entirety to illustrate and describe in detail the structure of the metal portion 21 and the seal 22 between the metal portion 21 and a mounting rail 23 mounted on the side 11 of the vehicle immediately above the roof.

Figure 3:
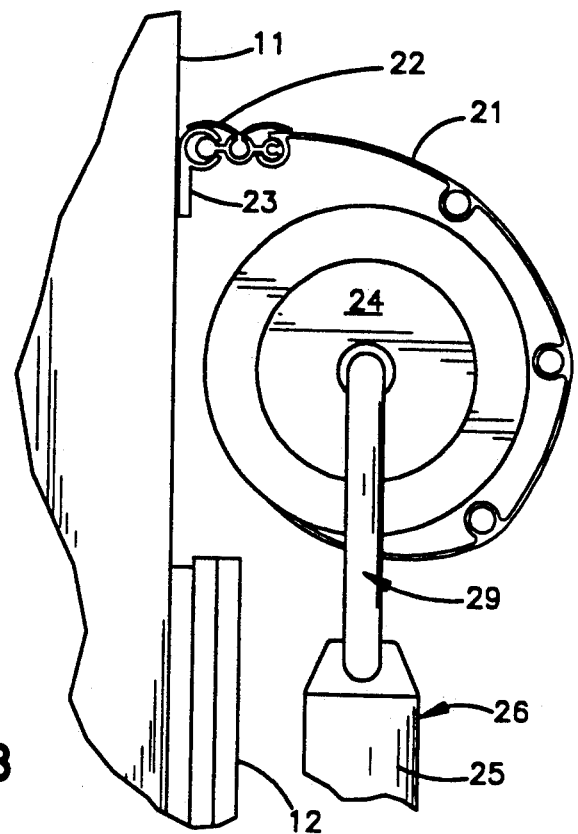
FIG. 3 is a fragmentary end view illustrating the awning and slide-out when the slide-out is in the retracted position.
Figure 4:
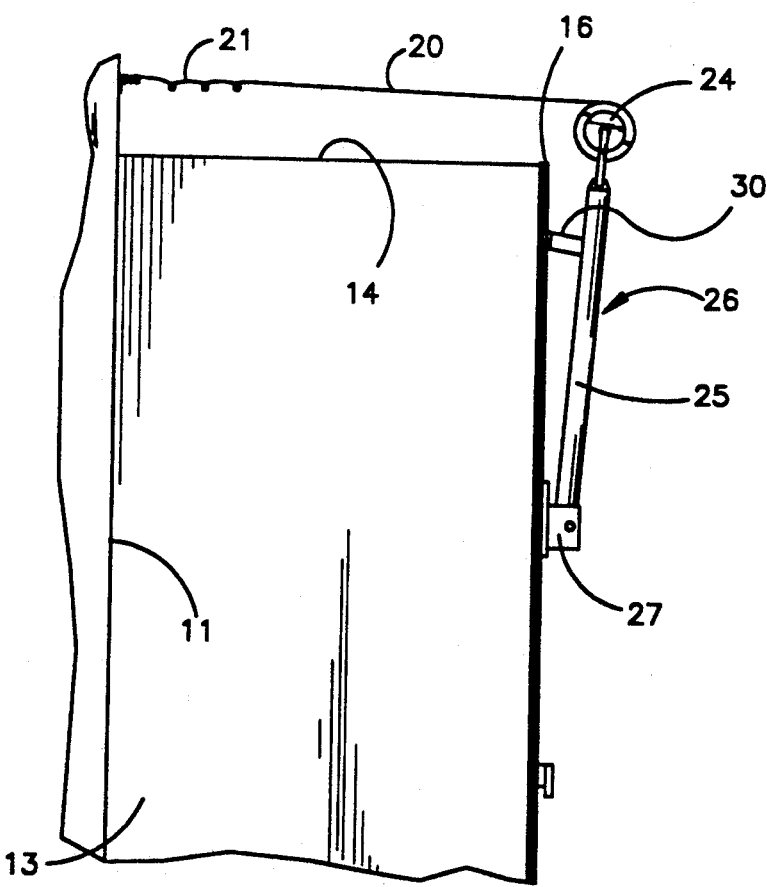
FIG. 4 illustrates the awning and slide-out when the slide-out is in the extended position and the awning has not been further extended to provide a window awning for a window provided in the slide-out.

Such segmented metal portion 21 provides an attractive, durable wrapping for the awning when the slide-out is in the retracted position and the awning is fully retracted, as illustrated in FIG. 3. It should be understood, however, that this invention can be utilized in connection with a retractable awning which does not provide such a metal shield wherein the flexible awning itself projects into a mounting rail 23 on the side 11 of the vehicle and is formed with a loop which is locked into a C-shaped portion of the mounting rail 23 by a rod projecting along the C-shape section through such loop.

The flexible awning extends from an inner edge mounted on the side 11 of the vehicle to an outer edge in which it is attached to a roller 24. Such roller is provided with a groove in the usual manner into which a loop and rod project to mount the outer edge of the flexible awning on the roller 24.

Connected at each end of the roller 24 is a support arm assembly 26. Each assembly is pivotally mounted at its lower end on a bracket 27 mounted on the outer wall 12 of the slide-out. Such brackets can be mounted on the outer wall 12 or directly on the trim 16. The support arm assembly includes two support arms 25, with one associated with each end of the roller 24. The inner ends are pivotally connected to the associated bracket 27, and the opposite or outer end is connected through a laterally extending mounting projection 29 to the adjacent end of the roller 24.

In the illustrated embodiment, the mounting projection is a generally U-shape having an outwardly extending inner leg 31, a base 32 extending perpendicular to the inner leg 31, and an inwardly extending leg 33 which is directly connected to the end of the roller 24. The inner leg 31 is longer than the inwardly extending leg 33 so that a roller having a length greater than the spacing between the brackets 27 can be supported by the arms 25 which are mounted on the outer wall 12 of the slide-out. The roller is longer than the width of the flexible awning 18 and projects beyond the end edges of the awning a small distance.

By providing these laterally extending mounting projections 29, it is possible to provide and support a roller which accommodates a flexible awning having a width at least equal to the width of the roof 14 of the slide-out so that complete coverage of such roof is provided. In fact, with this structure, the flexible awning can be somewhat wider than the roof so as to minimize the entry of any rain in between the awning and the roof. Further, with this invention, even when the flange 16 is fairly narrow, an awning which provides full coverage of the roof 14 can be provided.

In the illustrated embodiment, the awning also can be extended beyond the outer wall 12 by pivoting the support arms 25 down to a selected position in which the awning provides a typical awning coverage for a window 34 provided in the outer wall of the slide-out. The roller 24 is provided with a spring system which applies a torque tending to cause the roller to turn in the direction for wrapping the flexible awning 18 around the roller when the awning is retracted along with the slide-out 10. Such resiliently or torsionally biased roller systems are well-known to persons having ordinary skill in the art and is not specifically disclosed herein.

Figure 5:
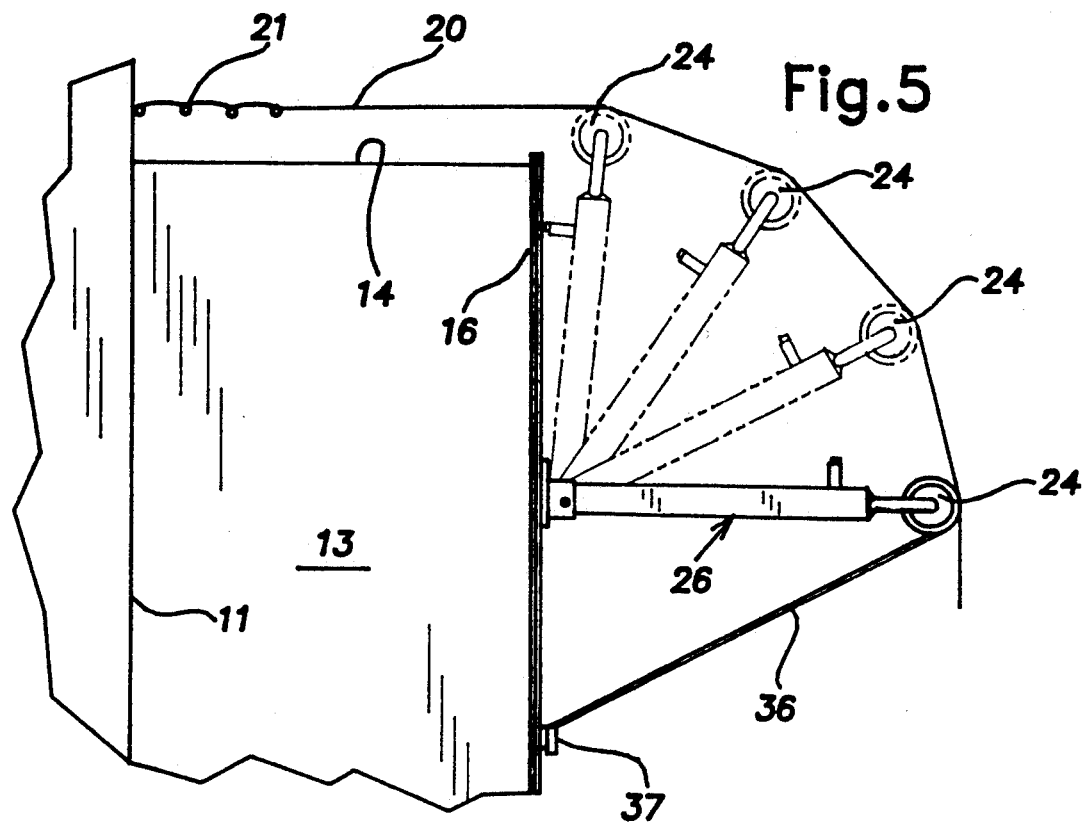
FIG. 5 illustrates the structure when the slide-out is extended and the awning is further extended to provide a window awning for a window in the slide-out.
Figure 6:
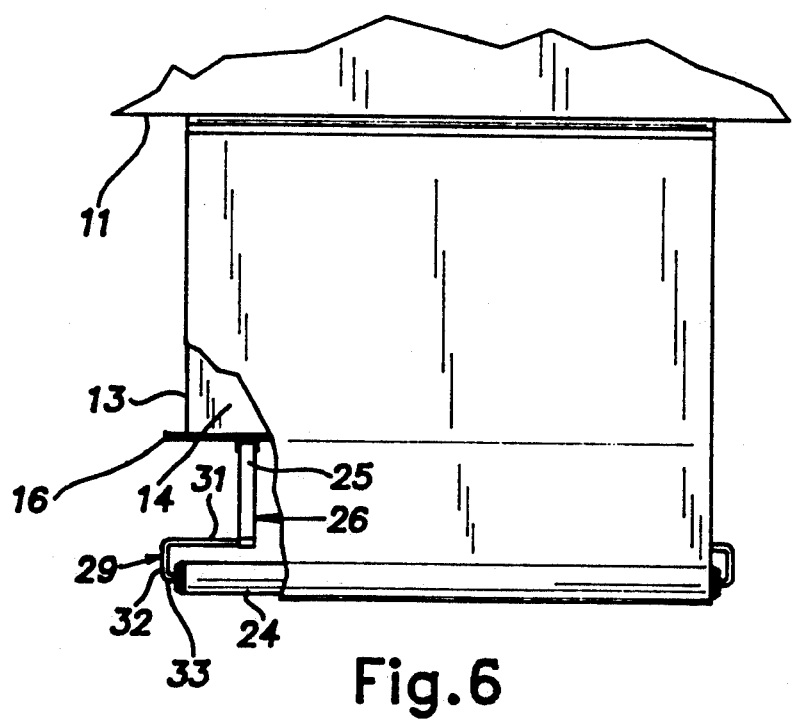
FIG. 6 is a plan view with portions of the awning cut away to the laterally extending roller mounting and the fact that the awning is at least as wide as the slide-out roof.

In order to extend the awning roll beyond the outer wall 12, a tie-down strap 36 is provided. Such tie-down strap connects with a roller at its center and hangs down from the roller when the slide-out is extended. This permits the user to grasp the lower end of the tie-down strap and pull the roller out and down to the desired position. When the desired position is reached, the tie-down strap 36 is connected to a bracket 37 mounted on the outer wall 12 below the window 34. In the illustrated embodiment, the tie-down strap is provided with a series of connecting points which allow the user to secure the roller in any one of the plurality of positions illustrated in FIG. 5.

A projection 30 maintains the roller away from the end wall 12. It should be understood that when the outer end of the roller 24 is lowered, the awning drops down against the upper edge of the trim, even though that is not illustrated in FIG. 5.

With the present invention, a retractable awning is provided which is at least as wide as the roof of a slide-out and can be installed on slide-outs even when the mounting brackets for the support arms 25 are spaced apart a distance less than the length of the roller supported thereby.

Although the preferred embodiment of this invention has been shown and described, it should be understood that various modifications and rearrangements of the parts may be resorted to without departing from the scope of the invention as disclosed and claimed herein.

What is claimed is:

1. A retractable awning for elongated vehicles transported on roads providing an interior enclosed at least in part by a side wall, a retractable slide-out in said side wall moveable from a retracted position in which said slide-out provides an outer wall substantially coplanar to said vehicle side wall and an extended position in which said slide-out projects laterally from said vehicle side wall and said outer wall is spaced laterally from said vehicle side wall, said slide-out providing other walls and a roof and floor enclosing a space open to said interior and increasing the side thereof when said slide-out is in said extended position, said roof having a width extending lengthwise of said vehicle, said retractable awning comprising a flexible awning having an inner edge adapted to be mounted on said vehicle side wall above said roof and an outer edge connected to a roller having ends, a pair of support means with one connected to each end of said roller, each support means providing a support bracket adapted to be mounted on said outer wall of said slide-out adjacent to the side edges thereof and spaced from each other a predetermined distance, said roller having a length exceeding said predetermined distance, said awning having a width at least substantially equal to the width of said roof, said pair of support means including a pair of elongated, generally parallel arms, each pivoted at one end on one of said support brackets, said generally parallel arms being spaced apart by said predetermined distance, each of said pair of support means also including an oppositely extending roller mount mounted on the other end of one of said parallel arms, said roller mounts being connected to and supporting the ends of said roller.

2. A retractable awning as set forth in claim 1, wherein said roller mounts are generally U-shaped having an inner leg and an outer leg joined by a base portion, said inner leg having a length greater than said outer leg, said inner leg being connected to the associated arm and said outer leg being connected to the adjacent end of said roller.

3. A retractable awning as set forth in claim 1, wherein a tie-down strap is connected to said roller intermediate its ends, and a tie-down bracket is adapted to be mounted on said outer side of said slide-out at a location spaced below said roof, said tie-down strap and tie-down bracket being structured to permit connection therebetween at a plurality of locations to permit said arms to position said roller in a plurality of positions below said roof.

4. An elongated vehicle comprising a housing having an interior enclosed at least in part by a side wall, a generally box-shaped rectangular slide-out open to said interior and providing a substantially flat horizontally extending roof, said slide-out being moveable relative to said side wall between a retracted position in which an outer wall of said slide-out is substantially coplanar with said vehicle side wall and said slide-out projects into said interior and an extended position in which said outer wall is spaced from said vehicle side wall, said slide-out increasing the adjacent width of said interior and said roof extending between said vehicle side wall and said outer side wall when said slide-out is in the extended position, a retractable awning having an inner edge connected to said vehicle above said roof and an outer edge connected to a retractable elongated roller, a pair of elongated support arms generally parallel to each other and spaced apart by a predetermined distance, each of said arms being pivotally mounted at one end on said outer wall of said slide-out and having at their other ends oppositely extending lateral projections connected to the ends of said roller, said roller having a length greater than the width of said roof and greater than said predetermined distance, said awning having a width at least as wide as said roof and less than the length of said roller.

* * * * *

UNITED STATES PATENT AND TRADEMARK OFFICE
CERTIFICATE OF CORRECTION

PATENT NO. : 5,280,687

DATED : January 25, 1994

INVENTOR(S) : Charles C. Boiteau

It is certified that error appears in the above-identified patent and that said Letters Patent is hereby corrected as shown below:

Column 2, line 55, after "FIG. 1" insert --is--.

Column 3, line 7, after "to" insert --illustrate--.

Column 5, line 49, (Claim 1, line 11) delete "side" and insert --size--.

Signed and Sealed this

Twenty-third Day of August, 1994

Attest:

BRUCE LEHMAN

Attesting Officer

Commissioner of Patents and Trademarks